United States Patent
Kimura

(10) Patent No.: US 10,746,573 B2
(45) Date of Patent: Aug. 18, 2020

(54) OPTICAL ENCODER AND MEASUREMENT DEVICE INCLUDING THE SAME

(71) Applicant: Mitutoyo Corporation, Kawasaki, Kanagawa (JP)

(72) Inventor: Akihide Kimura, Saitama (JP)

(73) Assignee: MITUTOYO CORPORATION, Kawasaki (JP)

(*) Notice: Subject to any disclaimer, the term of this patent is extended or adjusted under 35 U.S.C. 154(b) by 120 days.

(21) Appl. No.: 16/175,053

(22) Filed: Oct. 30, 2018

(65) Prior Publication Data

US 2019/0128705 A1    May 2, 2019

(30) Foreign Application Priority Data

Nov. 1, 2017 (JP) .................. 2017-211927

(51) Int. Cl.
*G01D 5/26* (2006.01)
*G01D 5/38* (2006.01)
*G01D 5/347* (2006.01)
*G02B 27/60* (2006.01)

(52) U.S. Cl.
CPC ......... *G01D 5/262* (2013.01); *G01D 5/34746* (2013.01); *G01D 5/38* (2013.01); *G02B 27/60* (2013.01)

(58) Field of Classification Search
CPC ...... G01D 5/262; G01D 5/34746; G01D 5/38; G02B 27/60
See application file for complete search history.

(56) References Cited

U.S. PATENT DOCUMENTS 5,450,199 A * 9/1995 Rieder .................. G01D 5/38
                                                           250/237 G

FOREIGN PATENT DOCUMENTS

JP           S6117016        1/1986
JP           2619566         6/1997

* cited by examiner

*Primary Examiner* — Georgia Y Epps
*Assistant Examiner* — Don J Williams
(74) *Attorney, Agent, or Firm* — Rankin, Hill & Clark LLP

(57) ABSTRACT

An optical encoder includes a light source, a plurality of diffraction gratings including grating faces on which a plurality of grooves are disposed in parallel, and a light-receiving unit configured to receive the light diffracted at the plurality of diffraction gratings. The diffraction gratings include a first diffraction grating that is a first-stage diffraction grating adjacent to the light source, a third diffraction grating that is a last-stage diffraction grating adjacent to the light-receiving unit, and a second diffraction grating that is an output-stage diffraction grating of the first-stage diffraction grating and an input-stage diffraction grating of the last-stage diffraction grating. The diffraction gratings are disposed such that the ratio of the first gap to the third gap equals the ratio of the second gap to the fourth gap, and a length of the first gap differs from a length of the second gap.

8 Claims, 9 Drawing Sheets

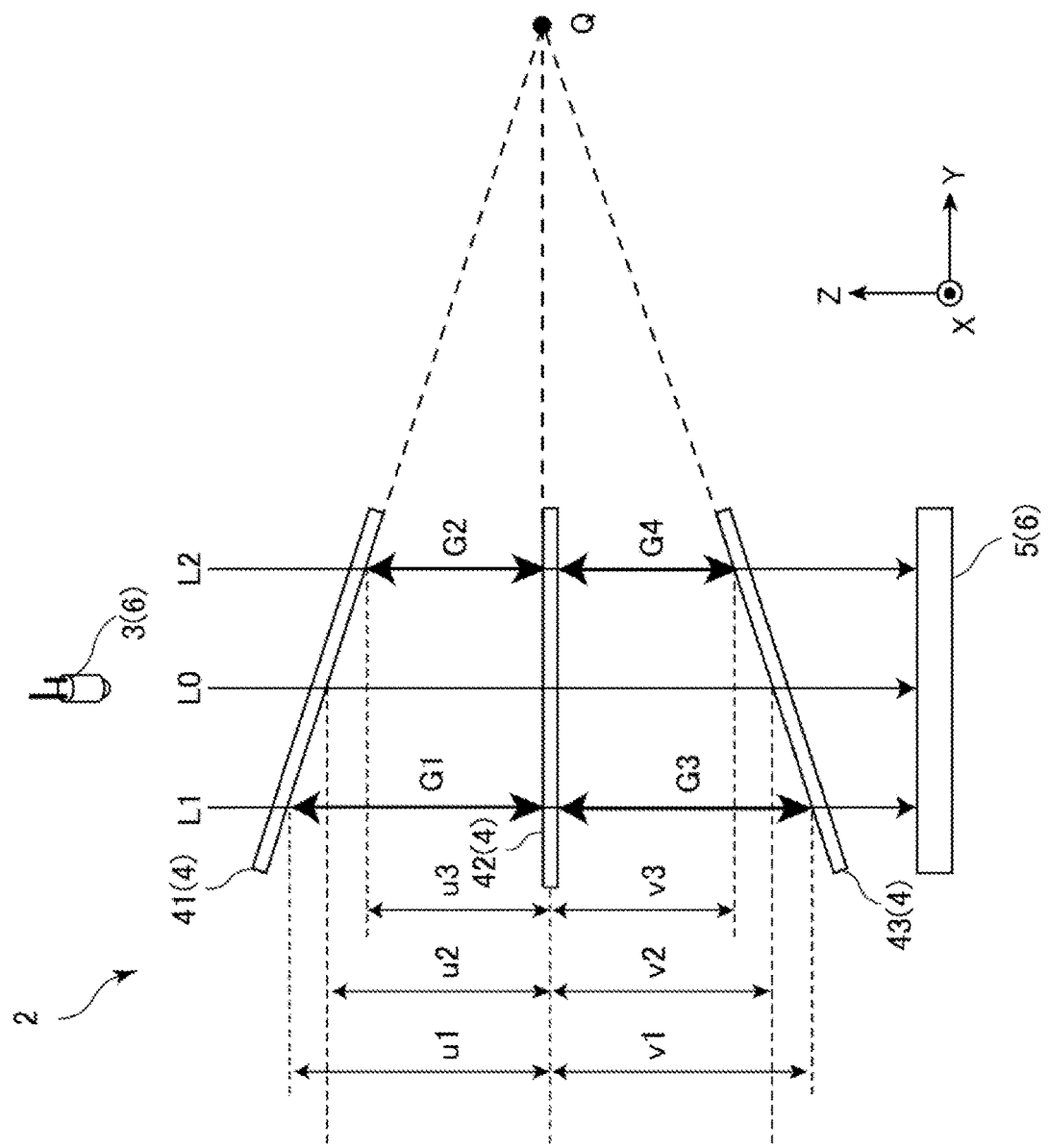

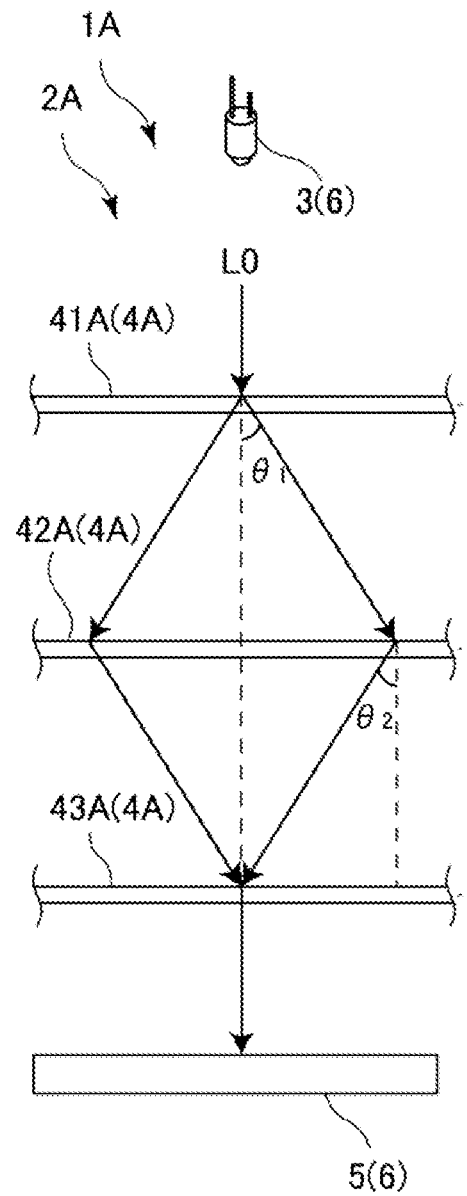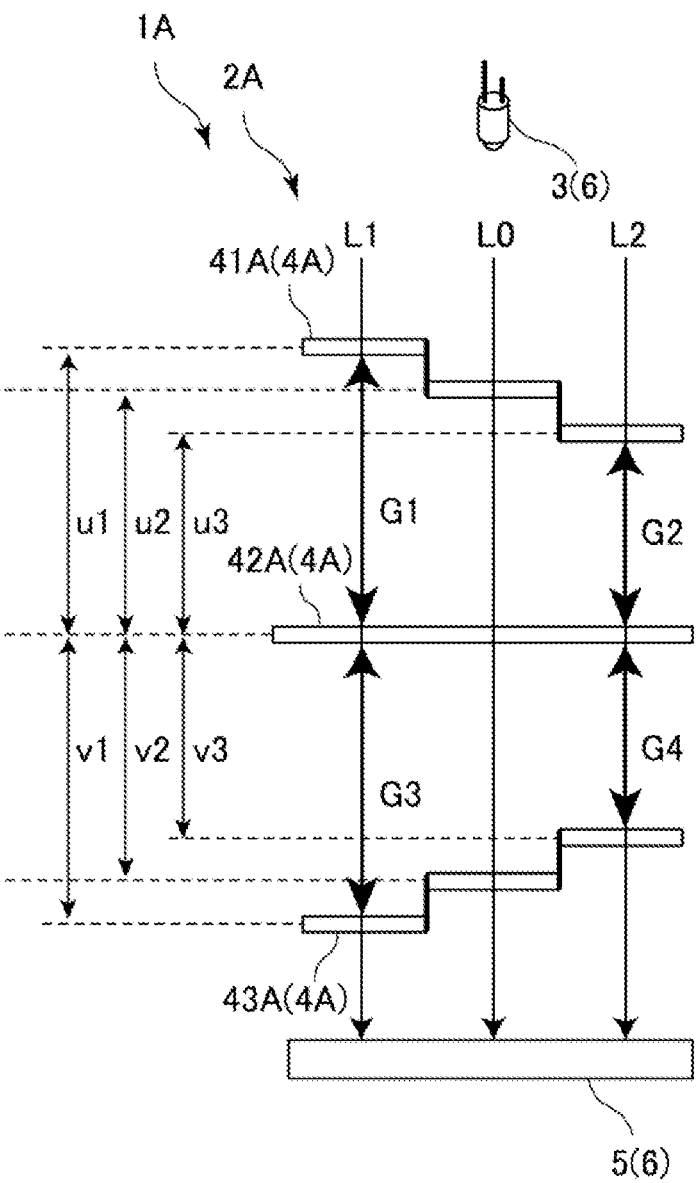

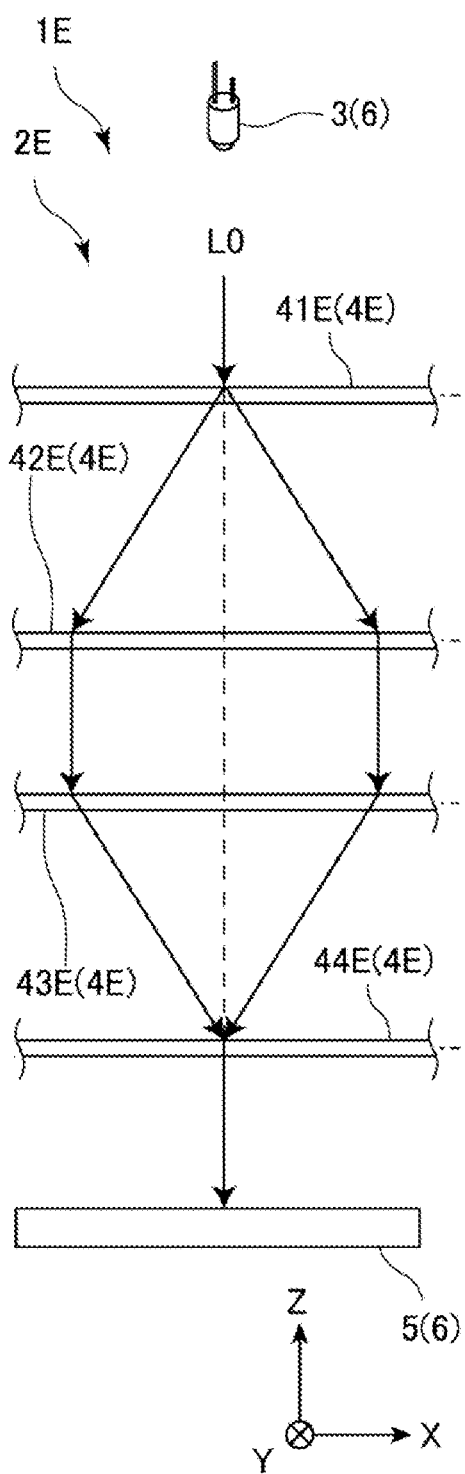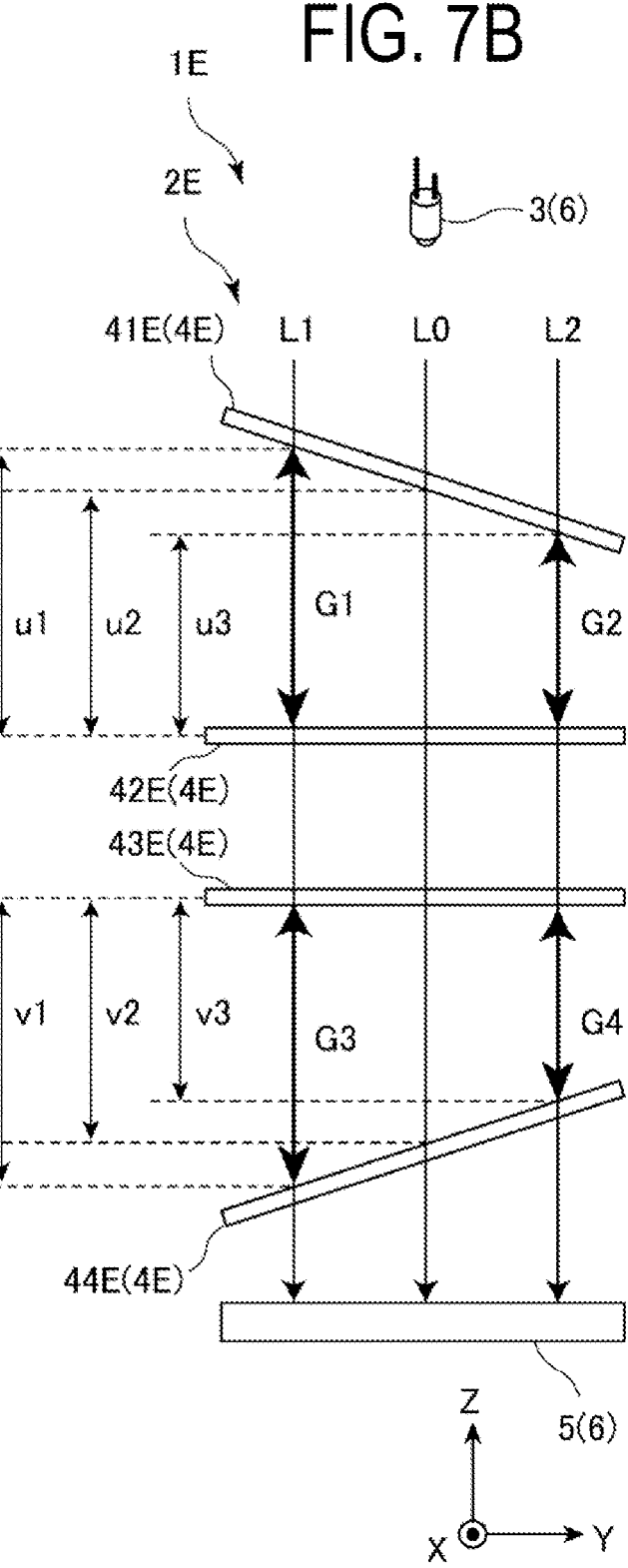

US 10,746,573 B2

OPTICAL ENCODER AND MEASUREMENT DEVICE INCLUDING THE SAME

TECHNICAL FIELD

The present invention relates to an optical encoder and a measurement device including the same.

BACKGROUND ART

An optical encoder has been known that includes a light source configured to emit parallel light, a plurality of diffraction gratings (scales) each having a grating face on which a plurality of grooves diffracting the parallel light are disposed in parallel, and a light-receiving unit (head) configured to receive the light diffracted at the diffraction gratings.

In this optical encoder, the parallel light emitted from the light source is diffracted into multiple diffracted light beams at the grooves of the diffraction gratings. The diffracted light beams generate an interference pattern having the same period as that of the diffraction gratings. The light-receiving unit detects a signal from the interference pattern. The optical encoder calculates the relative shift of the scale and the head from the result (signal) detected by the light-receiving unit.

The diffracted light beams include diffracted light traveling in the same direction as the optical axis of the light emitted from the light source, diffracted light traveling at predetermined diffraction angles on both sides of the optical axis, and diffracted light traveling at diffraction angles greater than the predetermined diffraction angles on both sides of the optical axis.

Among the diffracted light beams, the diffracted light beam traveling in the same direction as the optical axis is defined as a zeroth-order diffracted light beam. The other diffracted light beams are defined as ±first-order diffracted light beams and ±second-order diffracted light beams in the increasing order of the diffraction angle with reference to the zeroth-order diffracted light beam.

The light-receiving unit detects a signal primarily from an interference pattern generated from the ±first-order diffracted light. Consequently, the ±first-order diffracted light is defined as signal diffracted light, and the zeroth-order diffracted light and diffracted light of orders higher than the ±first-order diffracted light are defined as noise diffracted light.

When signal diffracted light and noise diffracted light are incident on the light-receiving unit, the interference pattern generated from the signal diffracted light is distorted by the noise diffracted light. As a result, the signal detected by the light-receiving unit contains noise. There is thus a problem in that relative shift calculated from the signal by the light-receiving unit has a low accuracy, and the optical encoder is less reliable.

In contrast, the interference-type position measurement device (optical encoder) described in Patent Document 1 includes an optical block and thereby removes noise diffracted light with the zeroth-order-diffracted-light shielding device and an integrated prism, to irradiate the scale with only the ±first-order diffracted light (signal diffracted light). However, such an optical encoder is provided with an integrated prism and/or a diffracted-light shielding device for blocking diffracted light excluding the ±first-order diffracted light. Hence, a space is required between the light source and the scale for reflection and refraction of the diffracted light beams. There is thus a problem in that the structure of the optical encoder becomes large.

FIG. 8 is a perspective view of a known optical encoder. FIGS. 9A and 9B illustrate an ideal interference pattern and an interference pattern containing noise diffracted light, respectively.

An averaging diffraction moire position detector (optical encoder) according to Patent Document 2 solves the problem of a size increase of the optical encoder through the following configuration.

With reference to FIG. 8, the averaging diffraction moire position detector includes a photomultiplier tube (light source) 300; a diffuser 400 having groove lines S; a first diffraction grating 401; a second diffraction grating 402 that is disposed parallel to the grading face of the first diffraction grating 401 and displaced in a direction orthogonal to the groove lines (grooves); and a unit 500 (light-receiving unit) that acquires detected results (signals) from the diffraction moire signals (interference pattern) derived from the two diffraction gratings 401 and 402 (a plurality of diffraction gratings).

The light beams from the photomultiplier tube 300 diffuse at the diffuser 400, pass through the first diffraction grating 401, and intersect each other at the second diffraction grating 402.

The two diffraction gratings 401 and 402 are disposed with a gap therebetween, the gap being created when disposing the first diffraction grating 401 and the second diffraction grating 402, such that the optical path length in the gap between the diffraction gratings 401 and 402 varies within the range of an optical path equivalent to integral multiple of the Fresnel number or two. Specifically, for example, in the case where the diffuser 400 and the two diffraction gratings 401 and 402 are disposed at equal intervals u along a freely-selected axis, the optical path length from the first diffraction grating 401 on one side of the freely-selected axis is u−Δu in a direction parallel to the grating face and orthogonal to the groove lines S. The optical path length on the other side of the freely-selected axis is u+Δu and is offset to the opposite direction. Hence, the second diffraction grating 402 tilts relative to the first diffraction grating 401.

The interference pattern generated on the light-receiving unit through the diffraction gratings is desirably a striped pattern, as illustrated in FIG. 9A. An interference pattern not including noise diffracted light and generated from only signal diffracted light is a striped pattern as illustrated in FIG. 9A. The light-receiving unit reads the interference pattern, for example, along the reading range C to detect a signal. The light-receiving unit can detect an ideal signal along any reading range even in a case where it is misaligned with the diffraction gratings because the interference pattern is a striped pattern.

In reality, however, the light passing through the diffraction gratings includes noise diffracted light, and thus, an interference pattern such as that illustrated in FIG. 9A cannot be generated.

In contrast, FIG. 9B illustrates an interference pattern from which an ideal signal can be detected even with noise. The interference pattern illustrated in FIG. 9B is generated, for example, in response to light from the photomultiplier tube 300 being diffused at the diffuser 400 and intersecting each other at the second diffraction grating 402 after passing through the first diffraction grating 401. The light-receiving unit 500 reads the interference pattern along, for example, a reading range C2 and conducts a predetermined calculation process on the read results, to acquire a signal similar to the ideal signal acquired through reading of the interference pattern illustrated in FIG. 9A. Although the reading range C2 needs to be wider than the reading range C for reading of the striped interference pattern illustrated in FIG. 9A, an ideal signal can be acquired from the interference pattern illustrated in FIG. 9B through a predetermined calculation process.

In the averaging diffraction moire position detector described in Patent Document 2, the second diffraction grating 402 tilts relative to the first diffraction grating 401. Thus, an interference pattern similar to that illustrated in FIG. 9B can be generated on the light-receiving unit. That is, an interference pattern similar to that from which an ideal signal can be acquired even with noise can be generated on the light-receiving unit.

Thus, the averaging diffraction moire position detector can generate an interference pattern similar to the interference pattern from which an ideal signal can be acquired without removal of noise with an integrated prism and/or a diffracted-light shielding device that blocks diffracted light other than the ±first-order diffracted light, by the second diffraction grating 402 tilted relative to the first diffraction grating 402. This prevents an increase in the size of the detector.

CITATION LIST

Patent Document

Patent Document 1: JP 2619566 B
Patent Document 2: JP S61-17016 A

SUMMARY OF INVENTION

Technical Problem

In the optical encoder according to Patent Document 2, the second diffraction grating 402 tilts relative to the first diffraction grating 401. Consequently, the light emitted from the photomultiplier tube 300 and diffused at the diffuser 400 may pass through the second diffraction grating 402 without intersecting each other at the second diffraction grating 402 or may intersect each other before reaching the second diffraction grating 402, as illustrated in FIG. 8. The light not intersecting each other at the second diffraction grating 402 is incident on the light-receiving unit 500 in the form of additional noise diffracted light. Thus, the generated interference pattern is not a uniform interference pattern, such as that illustrated in FIG. 9B, and distorted by the noise diffracted light due to light not intersecting each other at the second diffraction grating 402. The light-receiving unit 500 detects different signals depending on the positions of the reading range because the interference pattern (optical characteristics) is not uniform. Thus, a stable signal cannot be acquired. There is thus a problem in that the accuracy of the relative shift calculated from the signal detected by the light-receiving unit is low and the optical encoder is less reliable.

An object of the present invention is to provide an optical encoder that achieves uniform optical characteristics within the detecting range of a light-receiving unit while preventing an increase in the size of the optical encoder and enhancing the measurement precision.

Solution to Problem

An optical encoder according to the invention includes a light source configured to emit parallel light; a plurality of diffraction gratings including grating faces including a plurality of grooves disposed in parallel, the plurality of grooves being configured to diffract the parallel light; and a light-receiving unit configured to receive light diffracted at the plurality of diffraction gratings, wherein, the optical encoder is configured to carry out measurement along a length measurement direction, where the length measurement direction is a direction of the plurality of grooves disposed in parallel and a direction orthogonal to the parallel light, and a depth direction is a direction orthogonal to the length measurement direction and the parallel light, and a first axis extends in a direction orthogonal to the length measurement direction and the depth direction, a second axis extends in a direction parallel to the first axis and is offset to the depth direction, the plurality of diffraction gratings include a first-stage diffraction grating disposed at a first stage adjacent to the light source; and a last-stage diffraction grating disposed at a last stage adjacent to the light-receiving unit, and the first-stage diffraction grating and the last-stage diffraction grating are disposed such that a ratio of a first gap to a third gap equals a ratio of a second gap to a fourth gap, and a length of the first gap differs from a length of the second gap, where the first gap is a gap along the first axis between the first-stage diffraction grating and an output-stage diffraction grating of the first-stage diffraction grating, the second gap is a gap along the second axis between the first-stage diffraction grating and the output-stage diffraction grating of the first-stage diffraction grating, the third gap is a gap along the first axis between the last-stage diffraction grating and an input-stage diffraction grating of the last-stage diffraction grating, and the fourth gap is a gap along the second axis between the last-stage diffraction grating and the input-stage diffraction grating of the last-stage diffraction grating.

The diffraction gratings of the optical encoder according to the invention are positioned such that the ratio of the first gap to the third gap equals the ratio of the second gap to the fourth gap, and the length of the first gap differ from the length of the second gap. In this way, the light beams diffracted at the first-stage diffraction grating intersect each other at the last-stage diffraction grating. The noise diffracted light generated by the non-intersecting diffracted light beams can be suppressed through the intersection of the diffracted light beams at the last-stage diffraction grating. Thus, uniform optical characteristics can be achieved within the detecting range of the light-receiving unit. That is, an interference pattern such as that illustrated in FIG. 9B can be generated.

Thus, the optical encoder does not require a diffracted-light shielding device for blocking the noise diffracted light and can detect a uniform signal from an interference pattern including noise diffracted light. Thus, an increase in the size of the optical encoder can be prevented while achieving uniform optical characteristics within the detecting range of the light-receiving unit and enhancing the measurement precision.

It is preferred that the diffraction gratings be formed into a planar shape and be disposed such that the planes extending from grating faces of the diffraction gratings intersect each other on a straight line.

With such a configuration, the diffraction gratings each have a planner shape and thus can be readily manufactured. The diffraction gratings are disposed such that the planes extending from the grating faces of the diffraction gratings intersect each other on a straight line. Thus, the alignment of the diffraction gratings can be readily adjusted.

It is preferred that at least two of the diffraction gratings be formed into a stepwise shape and each include multiple steps.

With such a configuration, at least two of the diffraction gratings are formed into a stepwise shape and each include multiple steps. Thus, for example, in the case where the steps are disposed parallel to the grating faces of the diffraction gratings, the alignment of the diffraction gratings can be readily adjusted compared to planar diffraction gratings, and thus the optical encoder can be efficiently assembled. The diffraction gratings can be designed in accordance with the size and shape of the optical encoder by adjusting the positions of the steps. Thus, the diffraction gratings have enhanced flexibility in the design of the diffraction gratings and can prevent an increase in the size of the optical encoder.

It is preferred that an output-stage diffraction grating of a first-stage diffraction grating and an input-stage diffraction grating of a last-stage diffraction grating be the same diffraction grating.

With such a configuration, the output-stage diffraction grating of the first-stage diffraction grating and the input-stage diffraction grating of the last-stage diffraction grating are the same diffraction grating. Thus, the number of components can be reduced compared to an optical encoder including the output-stage diffraction grating of the first-stage diffraction grating and the input-stage diffraction grating of the last-stage diffraction grating as discrete diffraction gratings. The optical encoder can thus achieve reduced cost.

It is preferred that the first-stage diffraction grating and the last-stage diffraction grating be the same diffraction grating.

With such a configuration, the output-stage diffraction grating of the first-stage diffraction grating and the input-stage diffraction grating of the last-stage diffraction grating are the same diffraction grating, and the first-stage diffraction grating and the last-stage diffraction grating are the same diffraction grating. Thus, the number of components can be reduced even more compared to an optical encoder in which only the output-stage diffraction grating of the first-stage diffraction grating and the input-stage diffraction grating of the last-stage diffraction grating are the same. The optical encoder can thus achieve reduced cost.

It is preferred that the diffraction gratings be disposed such that the parallel light emitted from the light source is diffracted into a plurality of diffracted light beams at the first-stage diffraction grating and the diffracted light beams intersect each other at the last-stage diffraction grating.

With such a configuration, the diffraction gratings are disposed such that the parallel light emitted from the light source is diffracted into a plurality of diffracted light beams at the first-stage diffraction grating and the diffracted light beams intersect each other at the last-stage diffraction grating. Thus, the noise diffracted light generated by the non-intersecting diffracted light beams can be suppressed, and thus uniform optical characteristics can be achieved within the detecting range of the light-receiving unit. That is, an interference pattern such as that illustrated in FIG. 9B can be generated.

Thus, the optical encoder does not require a diffracted-light shielding device for blocking the noise diffracted light and can detect a uniform signal from an interference pattern including noise diffracted light. Thus, an increase in the size of the optical encoder can be prevented while achieving uniform optical characteristics within the detecting range of the light-receiving unit and enhancing measurement precision.

It is preferred that in a case that light traveling at predetermined diffraction angles on both sides of the optical axis of the light emitted from the light source is defined as signal diffracted light, the first gap and the second gap be designed to satisfy:

$$|u1-u3|=2\lambda \sin^2 \theta \qquad (1)$$

where u1 is the length of the first gap, u3 is the length of the second gap, $\lambda$ is a wavelength of the light source, and $\theta$ is an angle between a traveling direction of the signal diffracted light and a direction parallel to a direction of the optical axis of the light emitted from the light source.

The term "predetermined diffraction angles" refers to, for example, the angles at which the signal diffracted light and the noise diffracted light diffracted at the grooves of the first-stage diffraction grating travel toward the output-stage diffraction grating of the first-stage diffraction grating with reference to the optical axis of the light from the light source.

According to the invention, the first gap and the second gap of the diffraction gratings are designed to satisfy equation (1). Thus, the arrangement, including positions and angles, of diffraction gratings can be readily designed.

A measurement device according to the invention includes the optical encoder according to the invention; a light source configured to emit parallel light; a plurality of diffraction gratings including grating faces including a plurality of grooves disposed in parallel, the plurality of grooves being configured to diffract the parallel light; and a light-receiving unit configured to receive the light diffracted at the plurality of diffraction gratings, wherein the measurement device is configured to carry out measurement along a length measurement direction, where the length measurement direction is a direction of the plurality of grooves disposed in parallel and a direction orthogonal to the parallel light, and a depth direction is a direction orthogonal to the length measurement direction and the parallel light.

The measurement device according to the invention includes the optical encoder according to the invention and thus, does not require a diffracted-light shielding device for blocking the noise diffracted light and can detect a uniform signal from an interference pattern including noise diffracted light. Thus, an increase in the size of the optical encoder can be prevented while achieving uniform optical characteristics within the detecting range of the light-receiving unit and enhancing measurement precision.

BRIEF DESCRIPTION OF DRAWINGS

FIG. 3 illustrates planes extending from grating faces of diffraction gratings of the optical encoder intersecting each other on a straight line.

FIGS. 4A and 4B are side views of an optical encoder according to a second embodiment in the depth direction and the length measurement direction, respectively.

FIGS. 7A and 7B illustrate an optical encoder according to a second modification of the invention.

DESCRIPTION OF EMBODIMENTS

First Embodiment

A first embodiment of the invention will now be described with reference to FIGS. 1 to 3.

Figure 1:
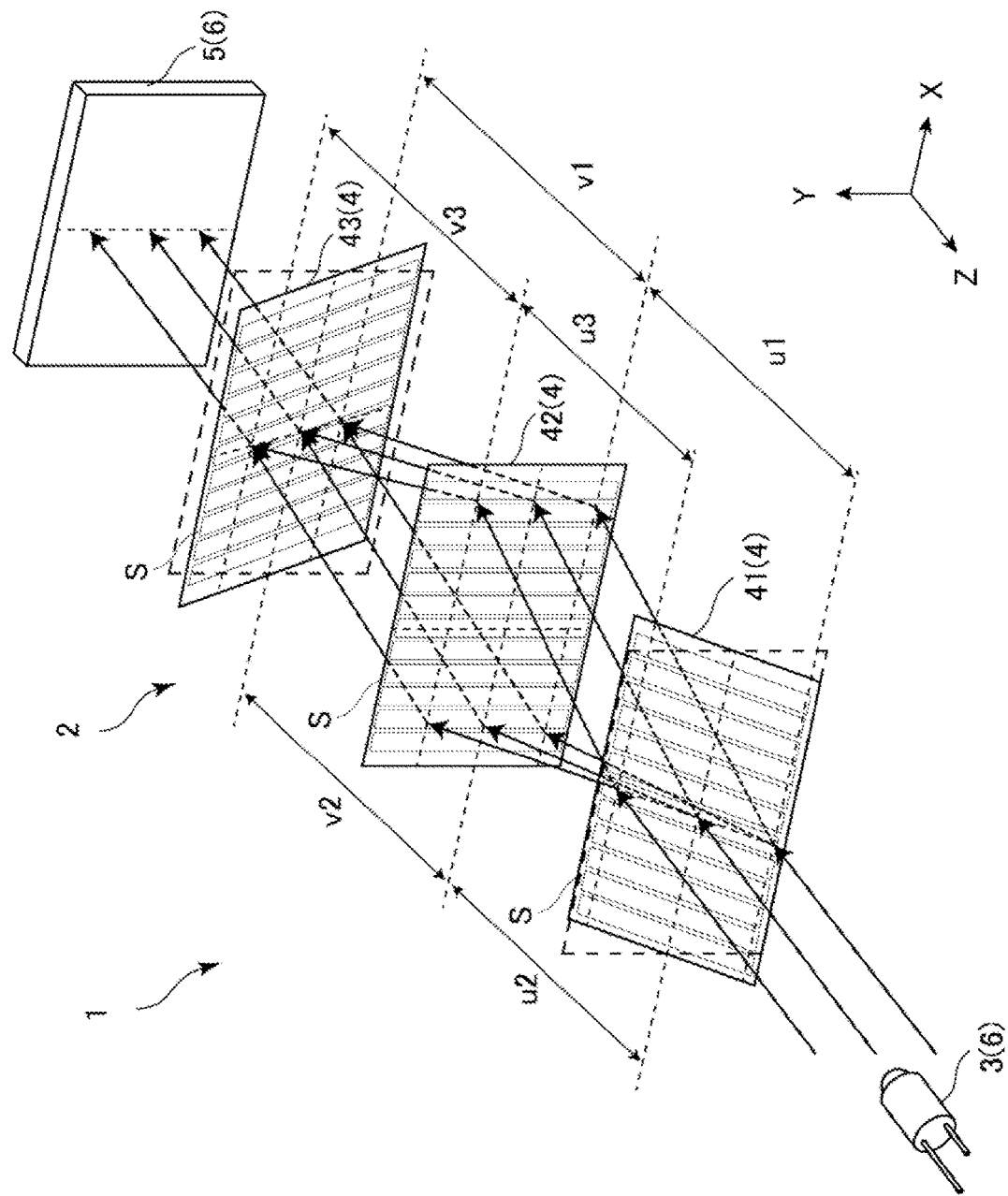
FIG. 1 is a perspective view of an optical encoder according to a first embodiment.

FIG. 1 is a perspective view of an optical encoder according to the first embodiment.

With reference to FIG. 1, a measurement device 1 includes an optical encoder 2. The optical encoder 2 is a linear encoder including a light source 3 configured to emit parallel light, a plurality of diffraction gratings 4 each having a grating face on which grooves S diffracting the parallel light are disposed in parallel, and a light-receiving unit 5 configured to receive the light diffracted at the diffraction gratings 4.

In the optical encoder 2, the length measurement direction is the direction in which the grooves S are disposed in parallel and orthogonal to the parallel light, and the depth direction is the direction orthogonal to the length measurement direction and the parallel light. Measurements are made along the length measurement direction.

In the following descriptions and the accompanying drawings, the length measurement direction is the X direction, the depth direction is the Y direction, and the direction orthogonal to the X and Y directions may be represented as the Z direction.

The light source 3 emits parallel light onto one face of the diffraction gratings 4. The light source 3 is, for example, a Light Emitting Diode (LED). The light source 3 may be any desired light source besides an LED.

The diffraction gratings 4 include a first diffraction grating 41, a second diffraction grating 42, and a third diffraction grating 43. The diffraction gratings 4 are formed into a planar shape and are composed of a transmissive material, such as glass, that transmits parallel light from the light source 3. The diffraction gratings 4 each has a grating face. The grating face is provided with multiple grooves S. The grooves S diffract the parallel light emitted from the light source 3 into multiple diffracted light beams.

The first diffraction grating 41 is a first-stage diffraction grating disposed at the first stage adjacent to the light source 3. The third diffraction grating 43 is a last-stage diffraction grating disposed at the last stage adjacent to the light-receiving unit 5.

The second diffraction grating 42 is an output-stage diffraction grating of the first-stage diffraction grating (first diffraction grating 41) and an input-stage diffraction grating of the last-stage diffraction grating (third diffraction grating 43). In specific, the output-stage diffraction grating of the first-stage diffraction grating (first diffraction grating 41) and the input-stage diffraction grating of the last-stage diffraction grating (third diffraction grating 43) are the same diffraction grating (second diffraction grating 42).

Although the diffraction gratings 4 have a substantially rectangular shape in FIG. 1, the diffraction gratings 4 extend in the measurement direction or X direction in accordance with the measurable range of the measurement device 1. In the drawings, the first diffraction grating 41 and the third diffraction grating 43 disposed parallel to the grating face of the second diffraction grating 42 are indicted by dotted lines.

The light-receiving unit 5 receives the diffracted light beams passing through the diffraction gratings 4 and detects a signal from an interference pattern generated by the diffracted light beams. The light-receiving unit 5 is a Photo Diode Array (PDA). The light source 3 and the light-receiving unit 5 are disposed facing each other across the diffraction gratings 4.

A PDA is a detector that can measure multiple interference patterns at once. The light-receiving unit 5 may be any desired detector besides a PDA, for example, a Position Sensitive Detector (PSD) or a Charge-Coupled Device (CCD).

The measurement device 1 includes a head 6 including the light source 3 and the light-receiving unit 5, which shift together relative to the diffraction gratings 4 along the length measurement direction or X direction.

The measurement device 1 shifts in the X direction of the diffraction gratings 4 and acquires positional information based on the relative shift of the diffraction gratings 4 and the head 6.

Figure 2A:
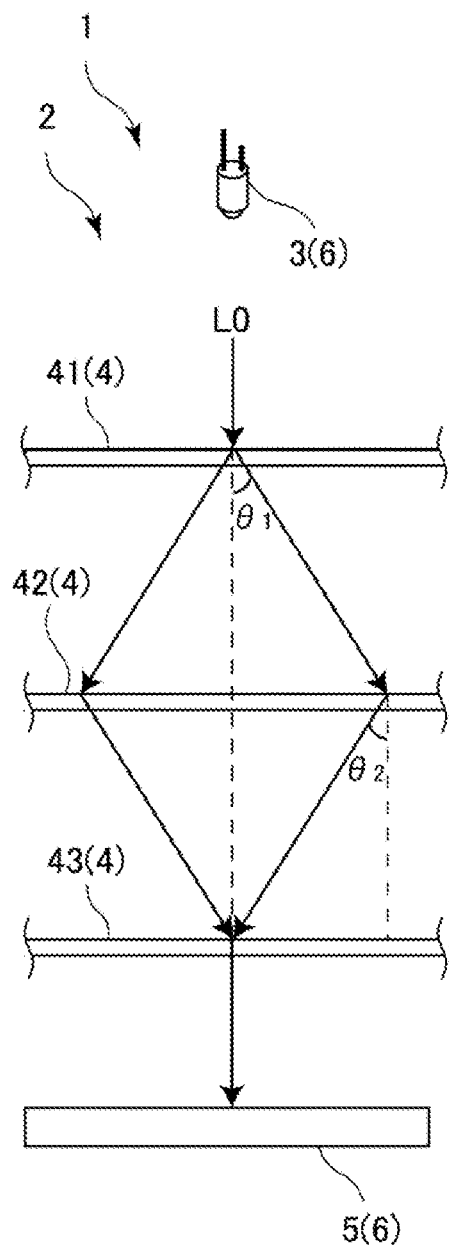
FIGS. 2A and 2B are side views of the optical encoder in the depth direction and the length measurement direction, respectively.
Figure 2B:
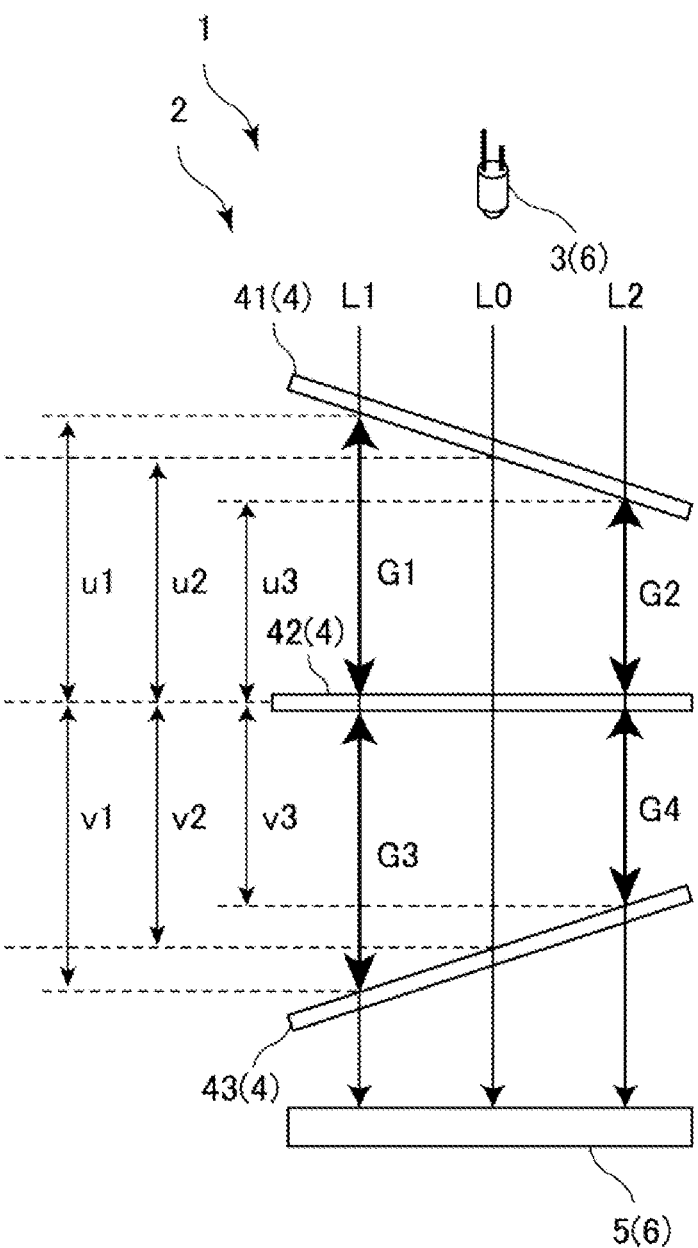

FIGS. 2A and 2B are a side view of the optical encoder in the depth direction and a side view in the length measurement direction, respectively. FIG. 3 illustrates planes extending from the grating faces of the diffraction gratings of the optical encoder intersecting each other on a straight line.

The positioning of the diffraction gratings 4 will now be described with reference to FIGS. 2A to 3.

In the diffraction grating 4 viewed from the depth direction or +Y direction, the first diffraction grating 41, the second diffraction grating 42, the third diffraction grating 43, and the light-receiving unit 5 are disposed parallel to the length measurement direction or X direction, as illustrated in FIG. 2A. The diffraction gratings 4 are positioned such that the parallel light emitted from the light source 3 is diffracted at the first diffraction grating 41 into multiple diffracted light beams and the diffracted light beams intersect each other at the third diffraction grating 43 after passing through the second diffraction grating 42. The light-receiving unit 5 detects a signal from the interference pattern generated by the diffracted light beams intersecting each other at the third diffraction grating 43.

In view from the length measurement direction or −X direction, the first diffraction grating 41 and the third diffraction grating 43 tilt relative to the second diffraction grating 42, as illustrated in FIG. 2B.

The axis extending in the Z direction or the direction orthogonal to the length measurement direction (X direction) and the depth direction (Y direction) is referred to as a first axis L1, and the axis extending in the direction parallel to the first axis L1 and offset in the depth direction (Y direction) is referred to as a second axis L2.

The gap between the first diffraction grating 41 and the second diffraction grating 42 along the first axis L1 is referred to as a first gap G1, and the gap between the first diffraction grating 41 and the second diffraction grating 42 along the second axis L2 is referred to as a second gap G2. The gap between the third diffraction grating 43 and the second diffraction grating 42 along the first axis L1 is referred to as a third gap G3, and the gap between the third diffraction grating 43 and the second diffraction grating 42 along the second axis L2 is referred to as a fourth gap G4.

The diffraction gratings 4 are disposed such that the ratio of the first gap G1 to the third gap G3 equals the ratio of the second gap G2 to the fourth gap G4. Furthermore, the diffraction gratings 4 are disposed such that the length of the first gap G1 differs from the length of the second gap G2. Accordingly, from such a positional relationship in which the ratio of the first gap G1 to the third gap G3 equals the ratio of the second gap G2 to the fourth gap G4, the length of the third gap G3 differs from the length of the fourth gap G4. In specific, the diffraction gratings 4 are disposed such that the length u3 of the second gap G2 is less than the length u1 of the first gap G1, and the length v3 of the fourth gap G4 is less than the length v1 of the third gap G3.

The relation u1>u2>u3 holds for the length u1 of the first gap G1, the length u3 of the second gap G2, the length u2 of the gap along the freely-selected axis L0 (optical axis of light emitted from the light source 3) disposed between the first diffraction grating 41 and the second diffraction grating 42 and between the first axis L1 and the second axis L2. Similarly, the relation v1>v2>v3 holds for the length v1 of the third gap G3, the length v3 of the fourth gap G4, the length v2 of the gap along the freely-selected axis L0 (optical axis of light emitted from the light source 3) disposed between the third diffraction grating 43 and the second diffraction grating 42 and between the first axis L1 and the second axis L2.

The diffraction gratings 4 are disposed such that the planes extending from the grating faces intersect each other at an intersection Q on a straight line, as illustrated in FIG. 3.

The first gap G1 to the fourth gap G4, which define the positioning (tilt angles) of the diffraction gratings 4, are designed to satisfy an integral multiple of the Fresnel number or two. In detail, this can be expressed by the equation below.

When signal diffracted light is the light traveling at predetermined diffraction angles on the both sides of the optical axis L0 of the light emitted from the light source 3, the first gap G1 and the second gap G2 are designed to satisfy the following equation:

$$|u1-u3|=2\lambda/\sin^2\theta \qquad (1)$$

where u1 is the length of the first gap G1, u3 is the length of the second gap G2, $\lambda$ is the wavelength of the light source 3, and $\theta$ is the angle between the traveling direction of the signal diffracted light and the direction parallel to the direction of the optical axis L0 of the light emitted from the light source.

Designing the first gap G1 to the fourth gap G4 to satisfy equation (1) can minimize the influence of the noise diffracted light on the detected results. In detail, the first gap G1 and the second gap G2 are designed by determining the difference between the length of the first gap G1 and the length of the second gap G2 by the following equation (2):

$$|u1-u3|=2P^2/\lambda \qquad (2)$$

where P is the first diffraction grating 41 among the first diffraction grating 41 and the second diffraction grating 42 and $\lambda$ is the wavelength of the light source 3.

Subsequently, the following equation (3) is derived:

$$\sin\theta_1=\lambda/P \qquad (3)$$

where $\theta_1$ is the angle between the traveling direction of the signal diffracted light diffracted at the first diffraction grating 41 and the direction parallel to the direction of the optical axis L0 of the light emitted from the light source 3 (see FIG. 2A).

The following equation (4) is derived from the equations (2) and (3), and the first gap G1 and the second gap G2 can be designed:

$$|u1-u3|=2\lambda/\sin^2\theta_1 \qquad (4)$$

The third gap G3 and the fourth gap G4 can also be similarly determined by v1 to v3 and $\theta_2$ (see FIG. 2A).

Designing the first gap G1 and the second gap G2 on the basis of the positional relationship in which the ratio of the first gap G1 to the third gap G3 equals the ratio of the second gap G2 to the four gap G4 can determine the design of the third gap G3 and the fourth gap G4.

Figure 9A:
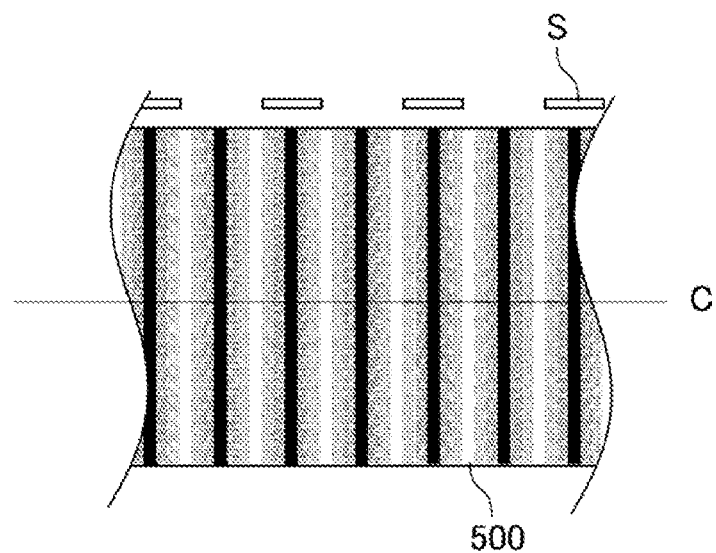
FIGS. 9A and 9B illustrate an ideal interference pattern and an interference pattern including noise diffracted light, respectively.
Figure 9B:
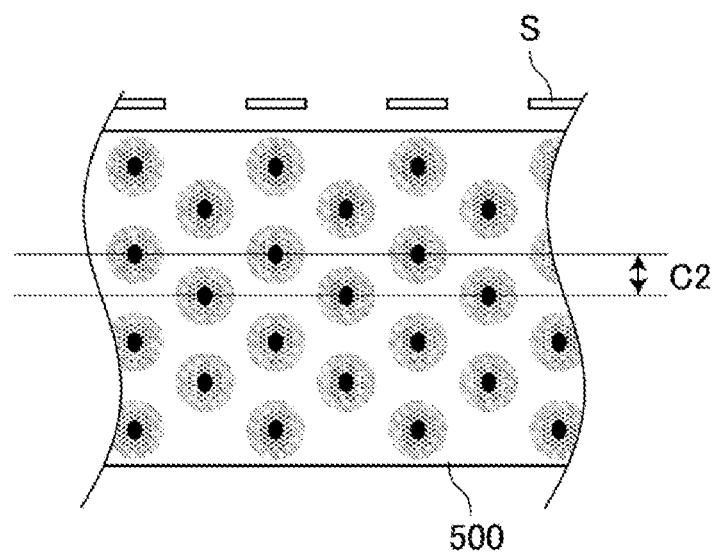

By positioning the diffraction gratings 4 on the basis of such a design, the optical encoder 2 can generate an interference pattern from which the light-receiving unit 5 can acquire an ideal signal, as illustrated in FIG. 9B.

According to this embodiment, the following advantage effects can be achieved.

(1) The optical encoder 2 can achieve uniform optical characteristics within the detecting range of the light-receiving unit through positioning of the diffraction gratings 4 such that the ratio of the first gap G1 to the third gap G3 equals the ratio of the second gap G2 to the fourth gap G4 and the length of the first gap G1 differs from the length of the second gap G2.

Hence, the optical encoder 2 does not require a diffracted-light shielding device for blocking noise diffracted light and can detect a uniform signal from an interference pattern including noise diffracted light. Thus, an increase in the size of the optical encoder 2 can be prevented while achieving uniform optical characteristics within the detecting range of the light-receiving unit 5 and enhancing the measurement precision.

(2) The diffraction gratings 4 each are formed into a planner shape and thus can be readily manufactured.

(3) The diffraction gratings 4 are disposed such that planes extending from the grating faces of the diffraction gratings 4 intersect each other on a straight line. Thus, the alignment of the diffraction gratings 41, 42, and 43 can be readily adjusted.

(4) The output-stage diffraction grating of the first-stage diffraction grating and the input-stage diffraction grating of the last-stage diffraction grating are the same diffraction grating (the second diffraction grating 42). Thus, the number of components can be reduced compared to an optical encoder including the output-stage diffraction grating of the first-stage diffraction grating and the input-stage diffraction grating of the last-stage diffraction grating as discrete diffraction gratings. The optical encoder 2 can thus achieve reduced cost.

(5) The diffraction gratings 4 are disposed such that the parallel light emitted from the light source 3 is diffracted into diffracted light beams at the first diffraction grating 41 and the diffracted light beams intersect each other at the third diffraction grating 43. Thus, the noise diffracted light generated by the non-intersecting diffracted light beams can be prevented, and thus uniform optical characteristics can be achieved within the detecting range of the light-receiving unit 5. That is, an interference pattern such as that illustrated in FIG. 9B can be generated.

(6) The first gap G1 and the second gap G2 of the diffraction gratings 4 are designed to satisfy equation (1). Thus, the arrangement, including positions and angles, of the diffraction gratings 4 can be readily designed.

(7) The measurement device 1 includes the optical encoder 2 according to the invention and thus can detect a uniform signal from an interference pattern including noise diffracted light without a diffracted-light shielding device for blocking the noise diffracted light. Thus, an increase in the size of the optical encoder 2 can be prevented while achieving uniform optical characteristics within the detecting range of the light-receiving unit 5 and enhancing measurement precision.

Second Embodiment

A second embodiment of the invention will now be described with reference to FIG. 4. Note that in the following descriptions, components that have already been described will be given the same reference signs, and descriptions thereof will be omitted.

FIGS. 4A and 4B are a side view of an optical encoder according to the second embodiment in the depth direction and a side view in the length measurement direction, respectively.

The diffraction gratings 4 according to the first embodiment are formed into a planar shape and are disposed such that the planes extending from the grating faces of the diffraction gratings 4 intersect each other on a straight line. A plurality of diffraction gratings 4A of an optical encoder 2A of a measurement device 1A according to this embodiment differ from the diffraction gratings 4 according to the first embodiment in that at least two of the diffraction gratings 4A are formed into a stepwise shape and each include multiple steps, as illustrated in FIGS. 4A and 4B.

In specific, a first diffraction grating 41A and a third diffraction grating 43A are formed into a stepwise shape and the second diffraction grating 42A is formed into a planar shape in this embodiment. The grating face of the first diffraction grating 41A and the grating face of the third diffraction grating 43A are disposed parallel to the grating face of the second diffraction grating 42A.

The positional relationship among the first gap G1 to the fourth gap G4 is the same as that in the first embodiment in which the diffraction gratings 4A are disposed such that the ratio of the first gap G1 to the third gap G3 equals the ratio of the second gap G2 to the fourth gap G4. Furthermore, the diffraction gratings 4A are disposed such that the length of the first gap G1 differs from the length of the second gap G2. Accordingly, from such a positional relationship in which the ratio of the first gap G1 to the third gap G3 equals the ratio of the second gap G2 to the fourth gap G4, the diffraction gratings 4A are disposed such that the length of the third gap G3 differs from the length of the fourth gap G4.

According to this embodiment, the following advantageous effects can be achieved in addition to the same advantageous effects as (1) and (4) to (7) described in the first embodiment.

(8) At least two of the diffraction gratings 4A are formed into a stepwise shape and each include multiple steps. Thus, the alignment of the diffraction gratings 41A, 42A, and 43A can be readily adjusted compared to a case where the diffraction gratings 4A are formed into a planar shape. Hence, the optical encoder 2A can be efficiently assembled.

(9) The diffraction gratings 4A can be designed in accordance with the size and shape of the optical encoder 2 through adjustment of the positions of the steps. Thus, the diffraction gratings 4A have an improved flexibility in the design of the diffraction gratings 41A, 42A, and 43A and can prevent an increase in the size of the optical encoder 2A.

Third Embodiment

A third embodiment of the invention will now be described with reference to FIG. 5. Note that in the following descriptions, components that have already been described will be given the same reference signs, and descriptions thereof will be omitted.

Figure 5:
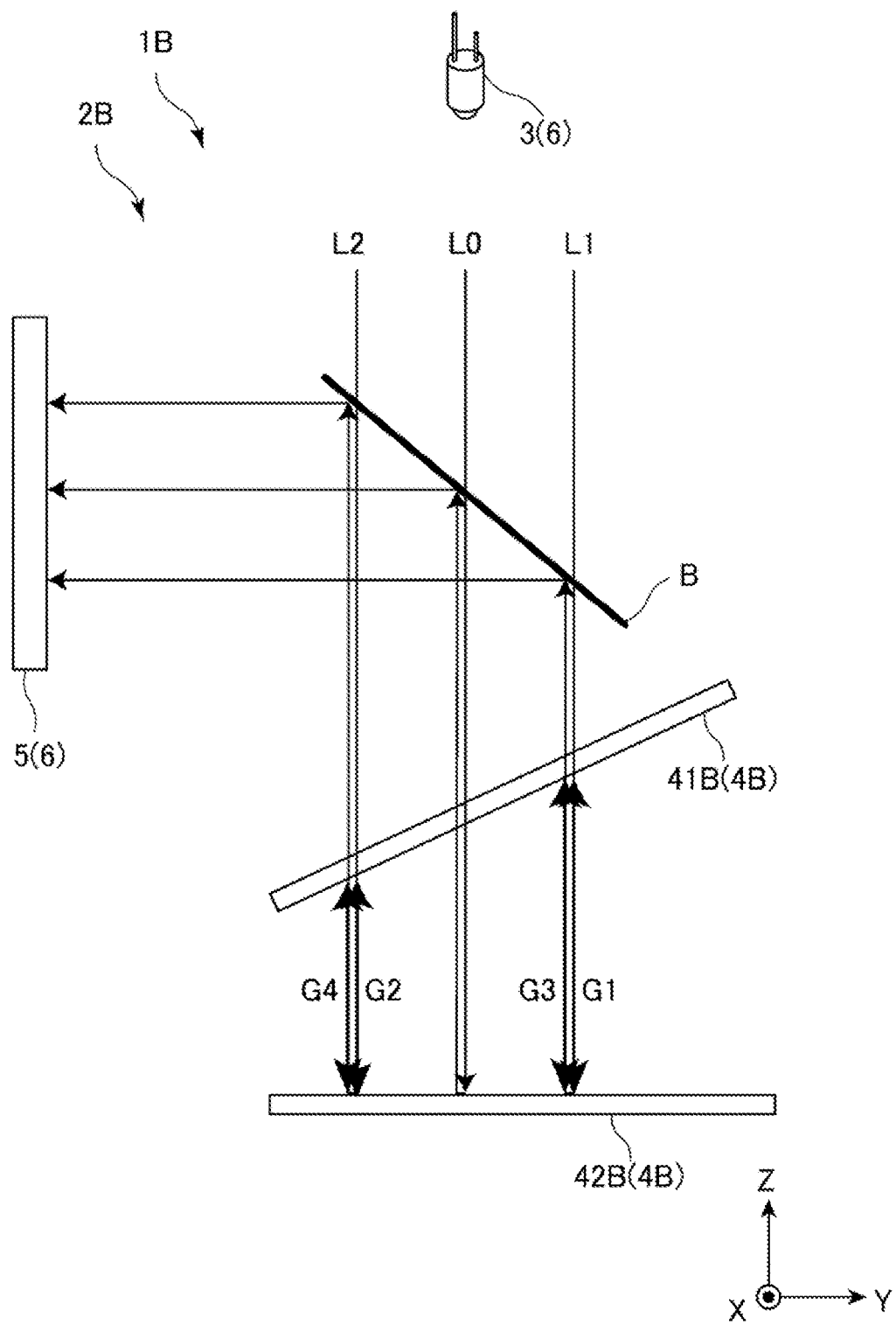
FIG. 5 is a side view of an optical encoder according to a third embodiment in the length measurement direction.

FIG. 5 is a side view of an optical encoder according to the third embodiment in the length measurement direction.

Among the diffraction gratings 4 according to the first embodiment, the first diffraction grating 41 is a first-stage diffraction grating disposed at the first stage adjacent to the light source 3, and the third diffraction grating 43 is a last-stage diffraction grating disposed at the last stage adjacent to the light-receiving unit 5. The second diffraction grating 42 is the output-stage diffraction grating of the first-stage diffraction grating (first diffraction grating 41) and the input-stage diffraction grating of the last-stage diffraction grating (third diffraction grating 43). In specific, the output-stage diffraction grating of the first-diffraction grating (first diffraction grating 41) and the input-stage diffraction grating of the last-stage diffraction grating (third diffraction grating 43) are the same diffraction grating (second diffraction grating 42).

An optical encoder 2B of a measurement device 1B according to this embodiment is a reflective linear encoder and differs from the optical encoder 2 according to the first embodiment in that it includes a beam splitter B that transmits the parallel light and refracts diffracted light diffracted at diffraction gratings 4B, as illustrated in FIG. 5.

The diffraction gratings 4B according to this embodiment include a first diffraction grating 41B that is the first-stage and the last-stage diffraction grating, and a second diffraction grating 42B that is the output-stage diffraction grating of the first-stage diffraction grating and the input-stage diffraction grating of the last-stage diffraction grating. The diffraction gratings 4B differ from those according to the first embodiment in that they consist of two diffraction gratings 41B and 42B.

Also, in the optical encoder 2B according to this embodiment, the positional relationship among the first gap G1 to the fourth gap G4 is the same as that in the optical encoder 2 according to the first embodiment in which the diffraction gratings 4B are disposed such that the ratio of the first gap G1 to the third gap G3 equals the ratio of the second gap G2 to the fourth gap G4. Furthermore, the diffraction gratings 4B are disposed such that the length of the first gap G1 differs from the length of the second gap G2. Accordingly, from such a positional relationship in which the ratio of the first gap G1 to the third gap G3 equals the ratio of the second gap G2 to the fourth gap G4, the length of the third gap G3 differs from the length of the fourth gap G4.

According to this embodiment, the following advantageous effects can be achieved in addition to the same advantageous effects as (1) and (3) to (7) described in the first embodiment.

(10) In the optical encoder 2B, the output-stage diffraction grating of the first-stage diffraction grating and the input-stage diffraction grating of the last-stage diffraction grating are the same diffraction grating (second diffraction grating 42B), and the first-stage diffraction grating and the last-stage diffraction grating are the same diffraction grating (first diffraction grating 41B). Thus, the number of components can be reduced even more compared to an optical encoder in which only the output-stage diffraction grating of the first-stage diffraction grating and the input-stage diffraction grating of the last-stage diffraction grating are the same (the second diffraction grating 42 according to the first embodiment). Thus, the optical encoder 2B can thus achieve reduced cost.

Variations on Embodiments

Note that the invention is not limited to the foregoing embodiments, and variations, improvements, and the like that fall within a scope in which the object of the invention can be achieved are also included within the invention.

The foregoing embodiments describe the measurement devices 1, 1A, and 1B respectively including the optical encoders 2, 2A and 2B according to the invention. Alternatively, for example, a rotary encoder may be used in place of the linear encoder for the optical encoder. The optical encoder may employ any detection method and detection scheme.

The diffraction gratings 4, 4A, and 4B are composed of glass in the foregoing embodiments. Alternatively, the diffraction gratings 4, 4A, and 4B may be composed of any transmissive material besides glass and have any desired thickness.

In the second embodiment, the first diffraction grating 41A and the third diffraction grating 43A are formed into a stepwise shape. Alternatively, the second diffraction grating 42A may also be formed into a stepwise shape. The grating face of the first diffraction grating 41A and the grating face of the third diffraction grating 43A include steps that are parallel to the grating face of the second diffraction grating 42. Alternatively, the steps may not be parallel to the grating face of the second diffraction gratings 42A. The diffraction gratings formed into a stepwise shape may each include, for example, wavy steps. That is, at least two of the diffraction gratings need only to be formed into a stepwise shape and each include multiple steps.

The diffraction gratings 4, 4A, and 4B according to the foregoing embodiments diffract the parallel light emitted from the light source 3 at the grooves S. The last-stage diffraction grating may include PDAs periodically disposed in parallel in place of the grooves.

Figure 6A:
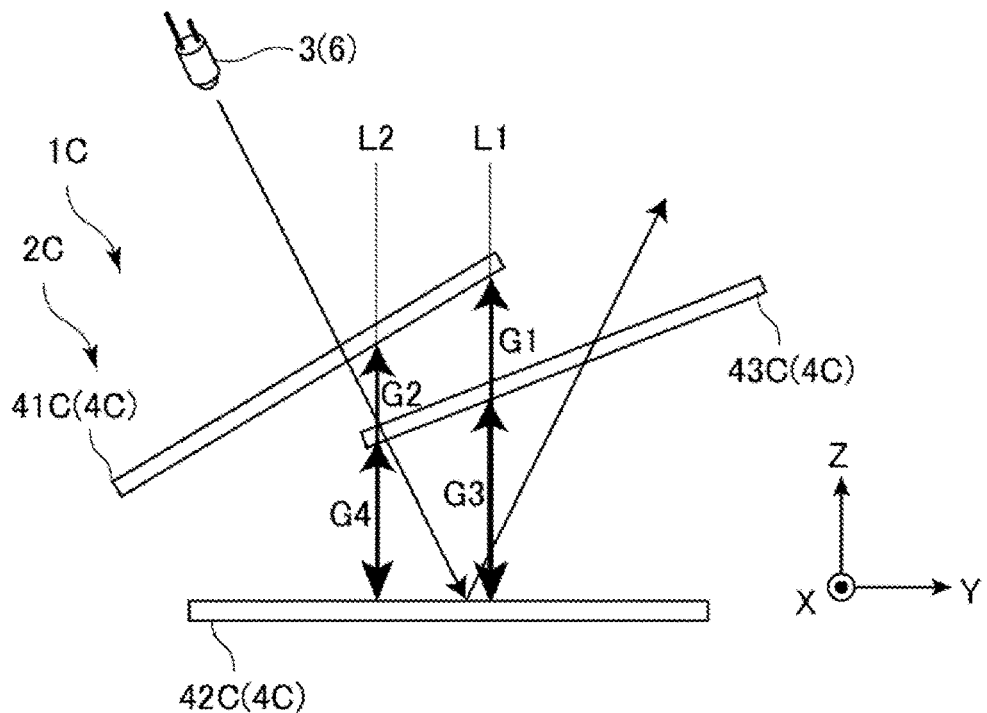
FIGS. 6A and 6B illustrate an optical encoder according to a first modification of the invention.
Figure 6B:
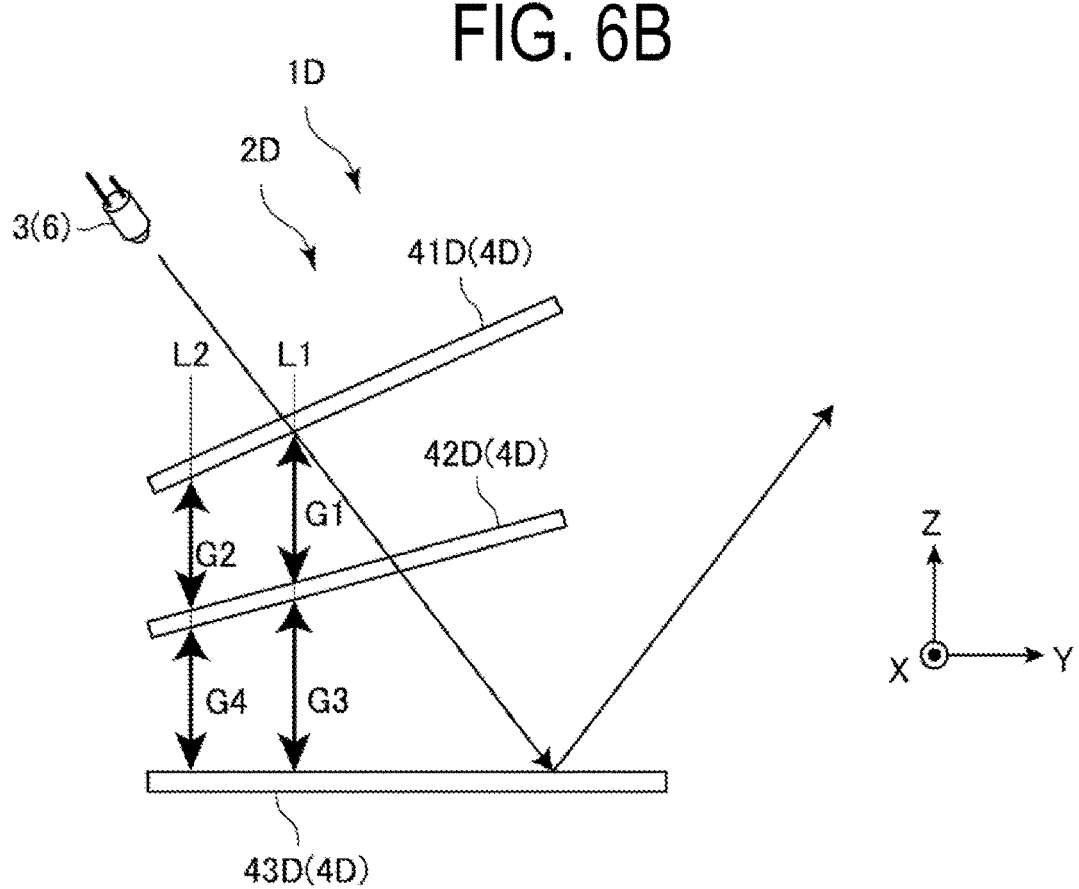
Figure 8:
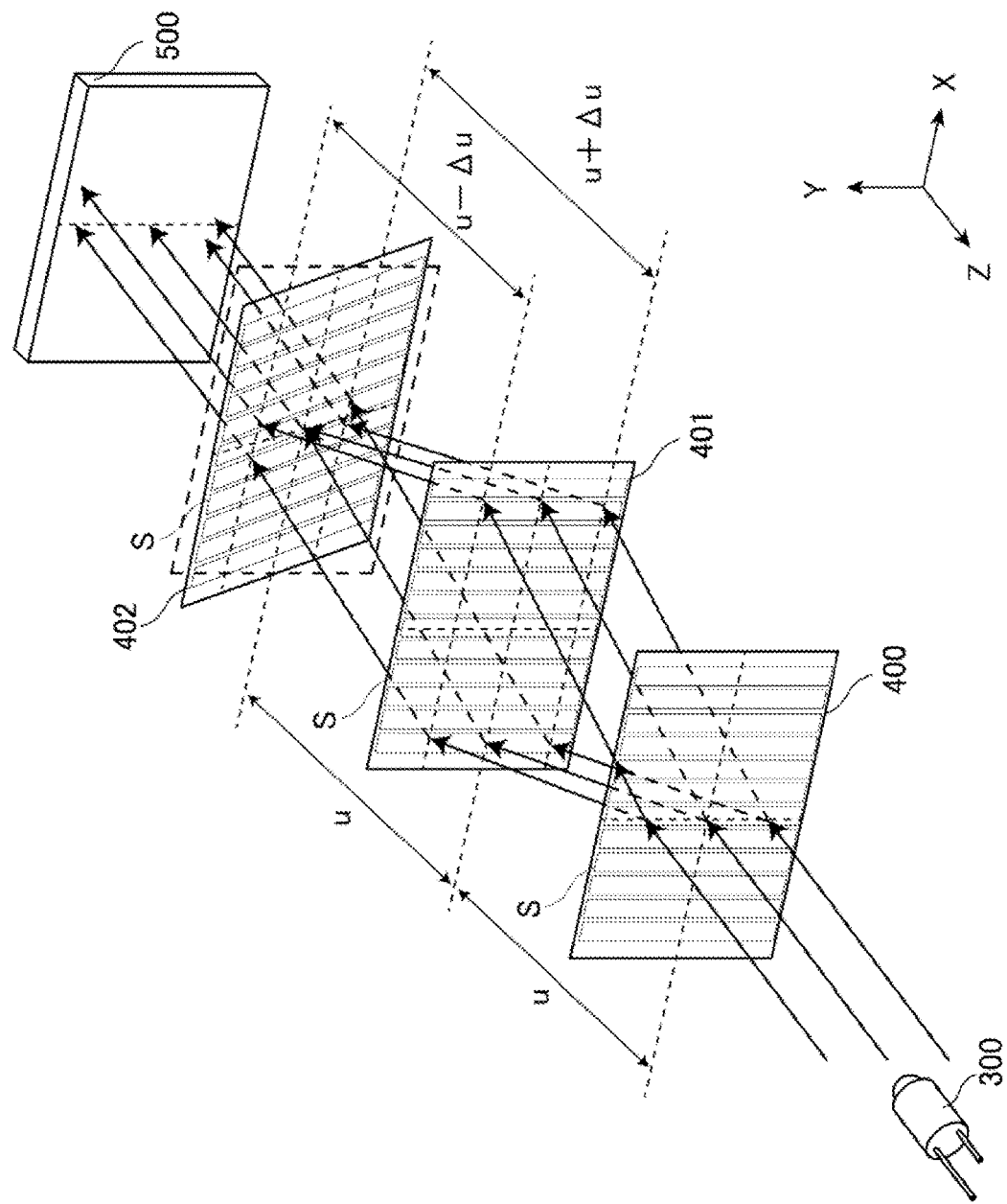
FIG. 8 is a perspective view of a known optical encoder.

FIGS. 6A and 6B illustrate an optical encoder according to a first modification of the invention.

In the first and second embodiments, the diffraction gratings 4 and 4A are transmissive diffraction gratings. This modification differs from the first and second embodiments in that diffraction gratings 4C of an optical encoder 2C of a measurement device 1C include a first transmissive diffraction grating 41C, a second reflective diffraction grating 42C, and a third transmissive diffraction grating 43C, as illustrated in FIG. 6A. Furthermore, this modification differs from the first and second embodiments in that diffraction gratings 4D of an optical encoder 2D of a measurement device 1D include a first transmissive diffraction grating 41D, a second transmissive diffraction grating 42D, and a third reflective diffraction grating 43D, as illustrated in FIG. 6B.

The diffraction gratings 4C and 4D are each formed into a planar shape and are disposed such that the planes extending from the grating faces of the diffraction gratings 4C and 4D intersect each other on straight lines. Also, in the optical encoders 2C and 2D according to this modification, the positional relationship among the first gap G1 to the fourth gap G4 is the same as that in the optical encoder 2 according to the first embodiment in which the diffraction gratings 4C and 4D are disposed such that the ratio of the first gap G1 to the third gap G3 equals the ratio of the second gap G2 to the fourth gap G4. Furthermore, the diffraction gratings 4C and 4D are disposed such that the length of the first gap G1 differs from the length of the second gap G2. Accordingly, from such a positional relationship in which the ratio of the first gap G1 to the third gap G3 equals the ratio of the second gap G2 to the fourth gap G4, the length of the third gap G3 differs from the length of the fourth gap G4.

FIGS. 7A and 7B illustrate an optical encoder according to a second modification of the invention.

In the first and second embodiments, the diffraction gratings 4 and 4A respectively include the first diffraction gratings 41 and 41A, the second diffraction gratings 42 and 42A, and the third diffraction gratings 43 and 43A, i.e., the three diffraction gratings 4 and 4A, respectively.

In this modification illustrated in FIGS. 7A and 7B, a plurality of diffraction gratings 4E of an optical encoder 2E of a measurement device 1E include a first diffraction grating 41E or first-stage diffraction grating, a second diffraction grating 42E or output-stage diffraction grating of the first-stage diffraction grating, a third diffraction grating 43E or input-stage diffraction grating of a last-stage diffraction grating, and a fourth diffraction grating 44E or last-stage diffraction grating. This modification differs from the first and second embodiments in that four diffraction gratings 4E are provided.

In the case where the plurality of diffraction gratings include three diffraction gratings, the period of the grooves of the second diffraction grating is required to be short to obtain diffracted light at large angles at the second diffraction grating. In some cases, the designing of grooves having a short period requires advanced techniques. However, the four the diffraction gratings 4E, i.e., the first to fourth diffraction gratings 41E to 44E, allow easier designing of the period of the grooves of the diffraction gratings in comparison to that of three diffraction gratings. Alternatively, more than four diffraction gratings may be provided.

In the embodiments described above, the second gap G2 is smaller than the first gap G1 and the fourth gap G4 is smaller than the third gap G3. Alternatively, the first gap G1 may be smaller than the second gap G2 and the third gap may be smaller than the fourth gap G4.

The diffraction gratings 4 and 4A to 4E are disposed such that the parallel light emitted from the light source 3 is diffracted into multiple diffracted light beams at the first-stage diffraction grating and the diffracted light beams intersect each other at the last-stage diffraction grating. Alternatively, the diffracted light beams may not intersect each other at the last-stage diffraction grating.

That is, the optical encoder needs only to include a plurality of diffraction gratings each having a grating face on which multiple grooves diffracting the parallel light are disposed in parallel, and the diffraction gratings needs only to be disposed such that the ratio of the first gap G1 to the third gap G3 equals the ratio of the second gap G2 to the fourth gap G4, and the length of the first gap G1 differs from the length of the second gap G2.

In the embodiments described above, the first gap G1 and the second gap G2 are designed to satisfy equation (1), where the $\lambda$ is the wavelength of the light source 3 and $\theta$ is the angle between the traveling direction of the signal diffracted light and the direction parallel to the direction of the optical axis L0 of the light emitted from the light source. Alternatively, the first gap and the second gap may have any design so long as the ratio of the first to the third gap equals the ratio of the second gap to the fourth gap and the length of the first gap differs from the length of the second gap.

INDUSTRIAL APPLICABILITY

As described above, the present invention can be suitably used for an optical encoder and a measurement device including the optical encoder.

REFERENCE SIGNS LIST 1, 1A, 1B, 1C, 1D, 1E: Measurement device
2, 2A, 2B, 2C, 2D, 2E: Optical encoder 3: Light source
4, 4A, 4B, 4C, 4D, 4E: Plurality of diffraction grating
5: Light-receiving unit
41, 41A, 41C, 41D, 41E: First diffraction grating (first-stage diffraction grating)
41B: First diffraction grating (first-stage diffraction grating, last-stage diffraction grating)
42, 42A, 42B 42C, 42D: Second diffraction grating (output-stage diffraction grating of first-stage diffraction grating, input-stage diffraction grating of last-stage diffraction grating)
42E: Second diffraction grating (output-stage diffraction grating of first-stage diffraction grating)
43, 43A, 43B, 43C, 43D: Third diffraction grating (last-stage diffraction grating)
43E: Third diffraction grating (input-stage diffraction grating of last-stage diffraction grating)
44E: Fourth diffraction grating (last-stage diffraction grating)
G1: First gap
G2: Second gap
G3: Third gap
G4: Fourth gap
S: Groove

The invention claimed is:

1. An optical encoder comprising:
a light source configured to emit parallel light;
a plurality of diffraction gratings including grating faces including a plurality of grooves disposed in parallel, the plurality of grooves being configured to diffract the parallel light; and
a light-receiving unit configured to receive light diffracted at the plurality of diffraction gratings,
wherein,
the optical encoder is configured to carry out measurement along a length measurement direction, where the length measurement direction is a direction of the plurality of grooves disposed in parallel and a direction orthogonal to the parallel light, and a depth direction is a direction orthogonal to the length measurement direction and the parallel light, and
a first axis extends in a direction orthogonal to the length measurement direction and the depth direction,
a second axis extends in a direction parallel to the first axis and is offset to the depth direction,
the plurality of diffraction gratings include:
a first-stage diffraction grating disposed at a first stage adjacent to the light source; and
a last-stage diffraction grating disposed at a last stage adjacent to the light-receiving unit, and
the first-stage diffraction grating and the last-stage diffraction grating are disposed such that
a ratio of a first gap to a third gap equals a ratio of a second gap to a fourth gap, and a length of the first gap differs from a length of the second gap, where the first gap is a gap along the first axis between the first-stage diffraction grating and an output-stage diffraction grating of the first-stage diffraction grating, the second gap is a gap along the second axis between the first-stage diffraction grating and the output-stage diffraction grating of the first-stage diffraction grating, the third gap is a gap along the first axis between the last-stage diffraction grating and an input-stage diffraction grating of the last-stage diffraction grating, and the fourth gap is a gap along the second axis between the last-stage diffraction grating and the input-stage diffraction grating of the last-stage diffraction grating.

2. The optical encoder according to claim 1, wherein,
the plurality of diffraction gratings are formed in a planar shape, and
planes extending from grating faces of the plurality of diffraction gratings intersect each other on a straight line.

3. The optical encoder according claim 1, wherein at least two of diffraction gratings of the plurality of diffraction gratings are formed in a stepwise shape and include a plurality of steps.

4. The optical encoder according to claim 1, wherein the output-stage diffraction grating of the first-stage diffraction grating and the input-stage diffraction grating of the last-stage diffraction grating are the same diffraction grating.

5. The optical encoder according to claim 4, wherein the first-stage diffraction grating and the last-stage diffraction grating are the same diffraction grating.

6. The optical encoder according to claim 1, wherein the plurality of diffraction gratings are disposed such that the parallel light emitted from the light source is diffracted into a plurality of diffracted light beams at the first-stage diffraction grating, and the plurality of diffracted light beams intersect each other at the last-stage diffraction grating.

7. The optical encoder according to claim 1, wherein, in a case that signal diffracted light is light traveling at predetermined diffraction angles on both sides of an optical axis of the light emitted from the light source, the first gap and the second gap satisfy:

$$|u1-u3|=2\lambda/\sin^2 \theta \qquad (1)$$

where u1 is the length of the first gap, u3 is the length of the second gap, $\lambda$ is a wavelength of the light source, and $\theta$ is an angle between a traveling direction of the signal diffracted light and a direction parallel to a direction of the optical axis of the light emitted from the light source.

8. A measurement device comprising:
the optical encoder according to claim 1;
a light source configured to emit parallel light;
a plurality of diffraction gratings including grating faces including a plurality of grooves disposed in parallel, the plurality of grooves being configured to diffract the parallel light; and
a light-receiving unit configured to receive the light diffracted at the plurality of diffraction gratings,
wherein the measurement device is configured to carry out measurement along a length measurement direction, where the length measurement direction is a direction of the plurality of grooves disposed in parallel and a direction orthogonal to the parallel light, and a depth direction is a direction orthogonal to the length measurement direction and the parallel light.

* * * * *